US010384532B2

(12) United States Patent
Kawakami et al.

(10) Patent No.: US 10,384,532 B2
(45) Date of Patent: Aug. 20, 2019

(54) WORK VEHICLE

(71) Applicant: KOMATSU LTD., Tokyo (JP)

(72) Inventors: Takashi Kawakami, Tokyo (JP); Tatsuya Nakagami, Tokyo (JP); Kengo Aoki, Tokyo (JP)

(73) Assignee: KOMATSU LTD., Tokyo (JP)

( * ) Notice: Subject to any disclaimer, the term of this patent is extended or adjusted under 35 U.S.C. 154(b) by 66 days.

(21) Appl. No.: 15/555,667

(22) PCT Filed: Apr. 4, 2017

(86) PCT No.: PCT/JP2017/014123
§ 371 (c)(1),
(2) Date: Sep. 5, 2017

(87) PCT Pub. No.: WO2018/185846
PCT Pub. Date: Oct. 11, 2018

(65) Prior Publication Data
US 2019/0047402 A1 Feb. 14, 2019

(51) Int. Cl.
*B60K 11/04* (2006.01)
*F01P 5/02* (2006.01)
*B62D 21/18* (2006.01)
*F01P 1/00* (2006.01)
*F01P 3/00* (2006.01)

(52) U.S. Cl.
CPC ............ *B60K 11/04* (2013.01); *B62D 21/186* (2013.01); *F01P 5/02* (2013.01); *F01P 2001/005* (2013.01); *F01P 2003/001* (2013.01)

(58) Field of Classification Search
CPC ....... B62D 21/186; B62D 25/084; F01P 5/02; F01P 2001/005; F01P 2003/001; B60K 11/04
USPC ........................................ 180/68.4
See application file for complete search history.

(56) References Cited

U.S. PATENT DOCUMENTS

| | | | | |
|---|---|---|---|---|
| 4,542,785 A | * | 9/1985 | Bagnall | F01P 11/06 165/119 |
| 6,470,961 B1 | * | 10/2002 | Case | B60K 11/04 165/140 |
| 6,622,668 B2 | | 9/2003 | Izumi | |

(Continued)

FOREIGN PATENT DOCUMENTS

| | | |
|---|---|---|
| JP | 61-103519 U | 7/1986 |
| JP | 1-170883 U | 12/1989 |

(Continued)

OTHER PUBLICATIONS

The International Search Report for the corresponding international application No. PCT/JP2017/014123, dated Jun. 27, 2017.

*Primary Examiner* — John D Walters
(74) *Attorney, Agent, or Firm* — Global IP Counselors, LLP

(57) ABSTRACT

A work vehicle includes an engine, a cooling device, a cooling fan unit, and a regulating member. The cooling device includes a radiator core. The cooling device is disposed facing the engine. The cooling fan unit includes a cooling fan and is disposed between the engine and the cooling device. The regulating member is disposed above the cooling fan unit and regulates the movement of the cooling fan unit in the horizontal direction.

15 Claims, 13 Drawing Sheets

(56) References Cited

U.S. PATENT DOCUMENTS

| | | | | |
|---|---|---|---|---|
| 7,246,674 B2* | 7/2007 | Andritter | ............... | B60K 11/04 180/68.4 |
| 7,640,966 B2* | 1/2010 | Maeda | .................. | F28D 1/0435 165/41 |
| 8,342,277 B2* | 1/2013 | Kotani | .................... | F28F 9/002 180/68.4 |
| 8,356,683 B2* | 1/2013 | Menard | .................. | B60K 11/04 180/68.4 |
| 2002/0043820 A1* | 4/2002 | Brogly | .................. | B60K 11/04 296/203.02 |
| 2002/0157885 A1* | 10/2002 | Brown | .................... | B60K 11/04 180/68.4 |
| 2003/0062456 A1* | 4/2003 | Nakagawa | ......... | B60H 1/00464 248/200 |
| 2006/0213639 A1* | 9/2006 | Kobayashi | ............. | B60K 11/04 165/67 |
| 2006/0219451 A1* | 10/2006 | Schmitt | .................. | B60K 11/04 180/68.4 |
| 2008/0230291 A1* | 9/2008 | Kersting | ............. | B62D 25/084 180/68.4 |
| 2010/0078149 A1* | 4/2010 | Yoshimitsu | ............ | B60K 11/04 165/67 |
| 2010/0230073 A1* | 9/2010 | Kotani | .................... | F28F 9/002 165/67 |
| 2014/0251706 A1* | 9/2014 | Shibutani | ............... | B60K 11/04 180/68.4 |

FOREIGN PATENT DOCUMENTS

| | | |
|---|---|---|
| JP | 6-34132 U | 5/1994 |
| JP | 11-123940 A | 5/1999 |

\* cited by examiner

US 10,384,532 B2

WORK VEHICLE

CROSS-REFERENCE TO RELATED APPLICATIONS

This application is a U.S. National stage application of International Application No. PCT/JP2017/014123, filed on Apr. 4, 2017.

BACKGROUND

Field of the Invention

The present invention relates to a work vehicle.

Background

A work vehicle includes an engine, a cooling device, and a cooling fan unit. The cooling device includes, for example, a radiator or an oil cooler and is disposed facing the engine. The cooling fan unit includes a cooling fan and is disposed between the engine and the cooling device. A liquid coolant inside the oil cooler or the radiator is cooled by the cooling fan rotating and creating an air flow.

SUMMARY

The cooling fan unit is removed from the work vehicle during maintenance of the cooling fan unit. At this time, the cooling fan unit is removed, for example, by hoisting the cooling fan unit with a conveying means such as a wire and the like.

However, the cooling fan is disposed near the cooling device or the engine. As a result, the cooling fan may interfere with a nearby device due to the swinging of the cooling fan unit when lifting the cooling fan unit upwards.

An object of the present invention is to suppress interference with nearby devices when removing the cooling fan unit from the work vehicle.

A work vehicle according to a first aspect of the present invention includes an engine, a cooling device, a cooling fan unit, and a regulating member. The cooling device includes a radiator core. The cooling device is disposed facing the engine. The cooling fan unit includes a cooling fan and is disposed between the engine and the cooling device. The regulating member is disposed above the cooling fan unit and regulates the movement of the cooling fan unit in the horizontal direction.

Effects of Invention

According to the present invention, interference with nearby devices when removing the cooling fan unit from the work vehicle can be suppressed.

DETAILED DESCRIPTION OF EMBODIMENT(S)

Figure 1:
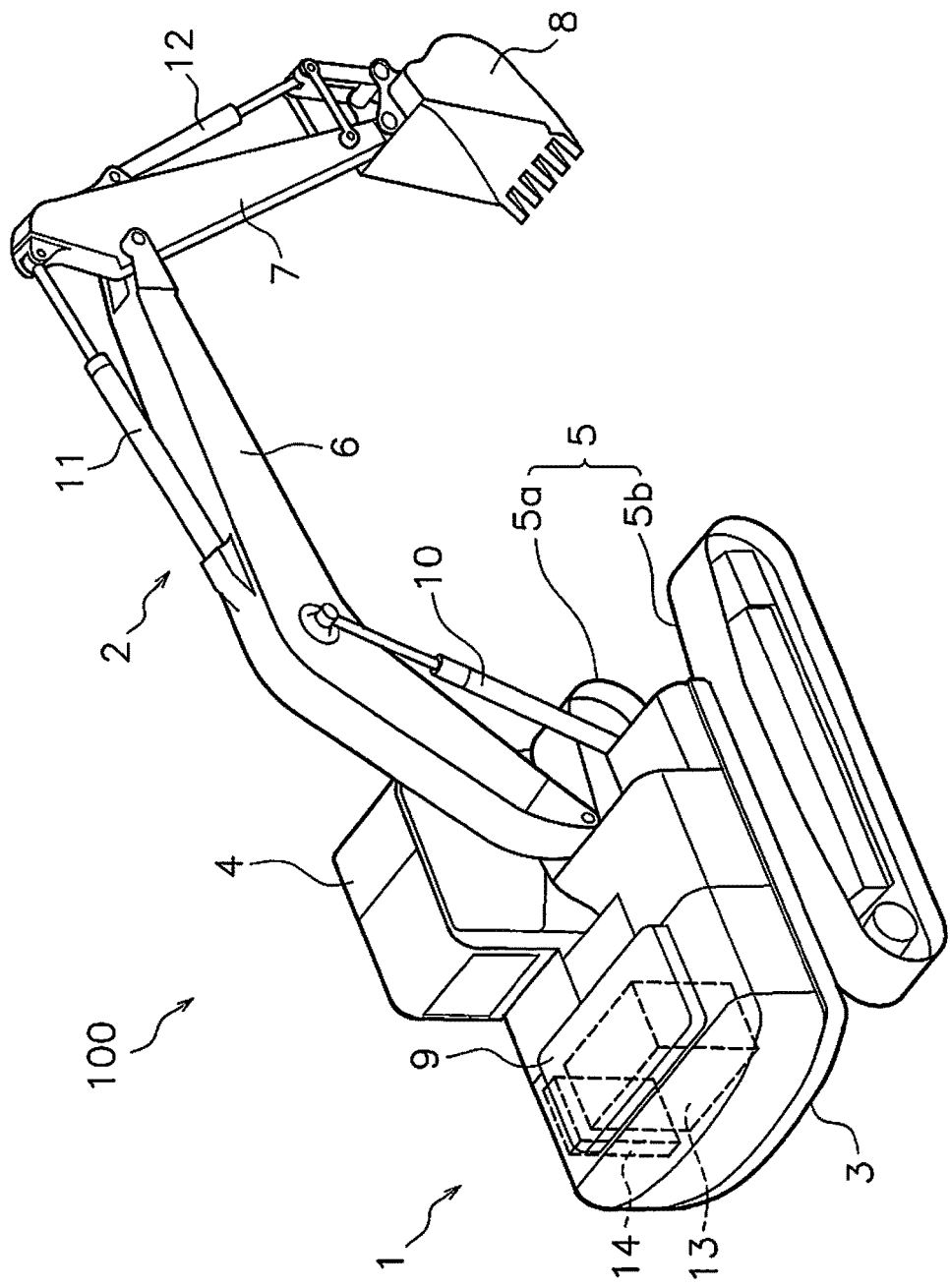
FIG. 1 is a perspective view of a work vehicle according to an embodiment.

A work vehicle according to an embodiment will be explained in detail with reference to the drawings. FIG. 1 is a perspective view of a work vehicle 100 according to an embodiment. The work vehicle 100 is a hydraulic excavator in the present embodiment. The work vehicle 100 includes a vehicle body 1 and a work implement 2.

The vehicle body 1 includes a revolving body 3 and a travel device 5. The revolving body 3 contains devices such as an engine and a hydraulic pump described below. A cab 4 is provided in the revolving body 3. The vehicle body 1 includes an engine compartment 9. The engine compartment 9 is disposed in the revolving body 3. The engine compartment 9 is disposed behind the cab 4. The travel device 5 includes crawler belts 5a and 5b, and the work vehicle 100 travels due to the rotation of the crawler belts 5a and 5b.

The work implement 2 is attached to the vehicle body 1. The work implement 2 includes a boom 6, an arm 7, and a bucket 8. The base end portion of the boom 6 is attached to the front portion of the vehicle body 1 in a movable manner. The base end portion of the arm 7 is attached to the tip portion of the boom 6 in a movable manner. The bucket 8 is attached to the tip portion of the arm 7 in a movable manner.

The work implement 2 includes a boom cylinder 10, and arm cylinder 11, and a bucket cylinder 12. The boom cylinder 10, the arm cylinder 11, and the bucket cylinder 12 are hydraulic cylinders that are driven by hydraulic fluid. The boom cylinder 10 drives the boom 6. The arm cylinder 11 drives the arm 7. The bucket cylinder 12 drives the bucket 8.

Figure 2:
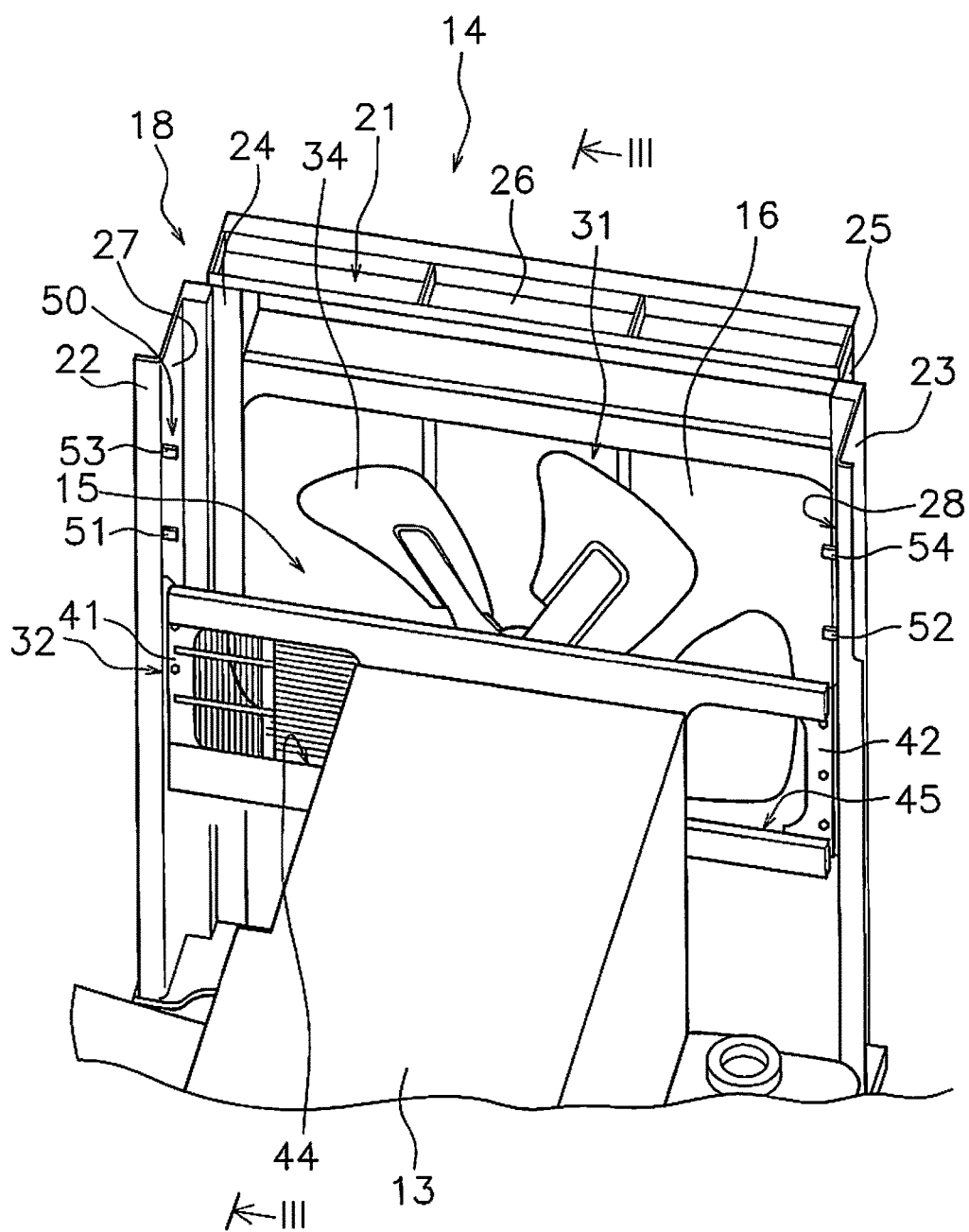
FIG. 2 is a perspective view illustrating the inside an engine compartment.
Figure 3:
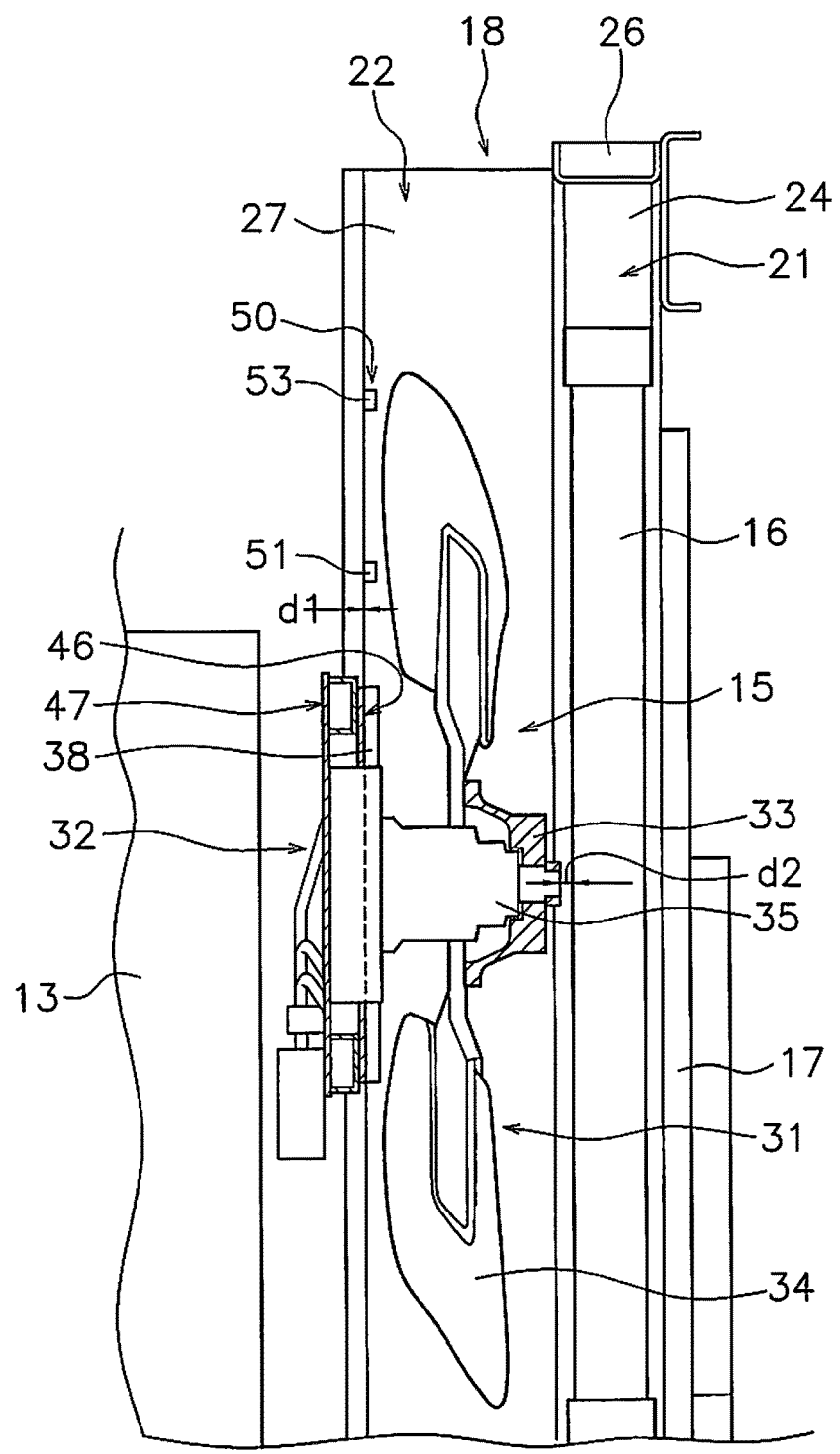
FIG. 3 is cross-sectional view along line III-III in FIG. 2.

FIG. 2 is a perspective view of the inside of the engine compartment 9. FIG. 3 is a cross-sectional view along line III-Ill in FIG. 2. As illustrated in FIGS. 2 and 3, the work vehicle 100 includes an engine 13, a cooling device 14, and a cooling fan unit 15. The engine 13, the cooling device 14, and the cooling fan unit 15 are disposed inside the engine compartment 9. The cooling device 14 is disposed facing the engine 13. The cooling device 14 includes a radiator core 16, an oil cooler 17, and a frame member 18.

In the following explanation, the left-right direction signifies the left and right directions as seen in the direction from the engine 13 toward the cooling device 14. The front-back direction signifies the front and back directions as seen in the direction from the engine 13 toward the cooling device 14.

The radiator core 16 includes, for example, piping and a plurality of heat radiation plates connected to the piping. A liquid coolant for the engine 13 flows through the radiator core 16. An air flow created by the cooling fan unit 15 passes through the radiator core 16 and the liquid coolant is cooled. The radiator core 16 is disposed facing the engine 13.

The oil cooler 17 includes, for example, piping and a plurality of heat radiation plates connected to the piping. Hydraulic fluid flows through the oil cooler 17. An air flow created by the cooling fan unit 15 passes through the oil cooler 17 and the hydraulic fluid is cooled. The oil cooler 17 is disposed facing the radiator core 16. The oil cooler 17 is disposed on the opposite side of the radiator core 16 as seen from the engine 13 side.

Figure 4:
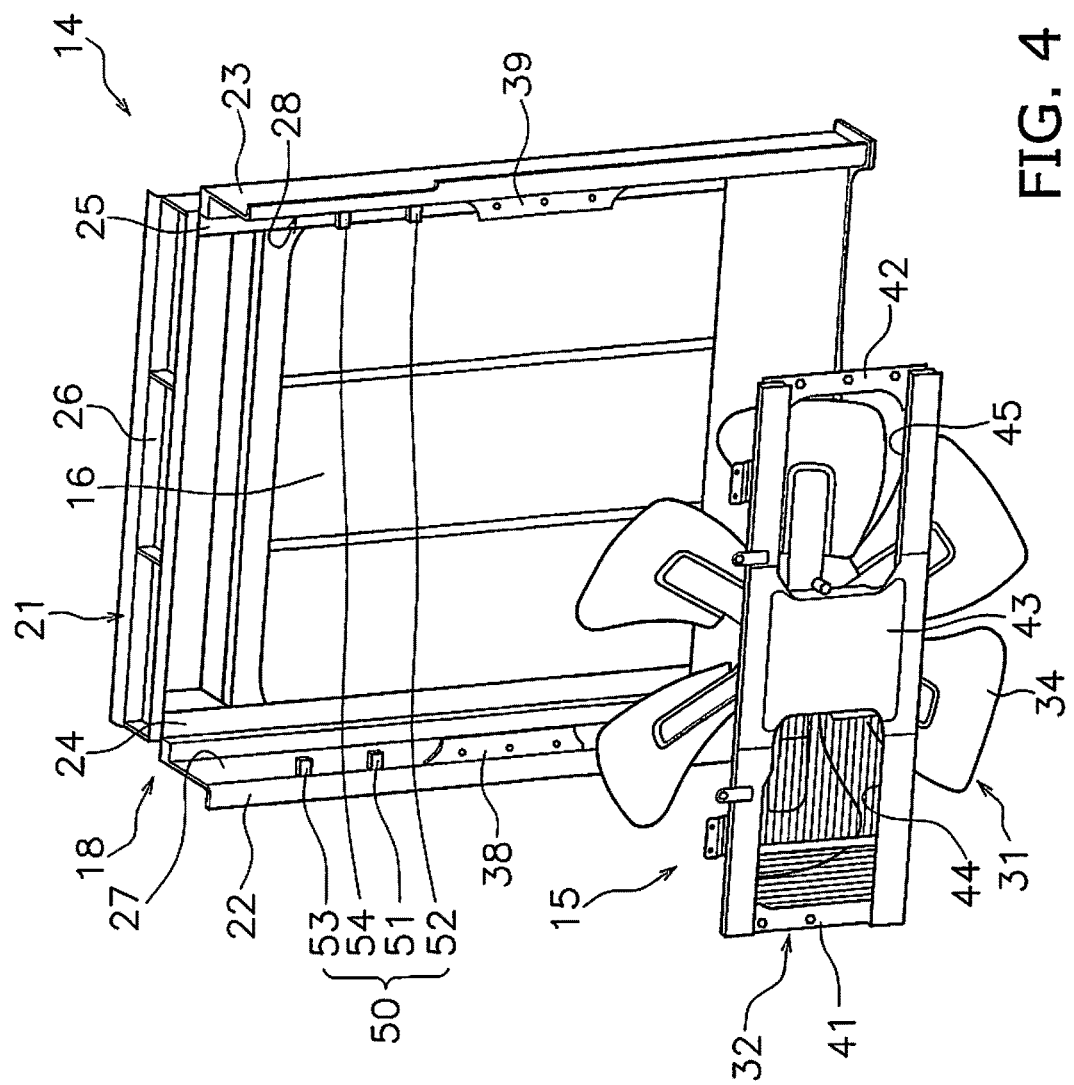
FIG. 4 is an exploded perspective view of the cooling fan unit and the cooling device.

The frame member 18 supports the radiator core 16 and the oil cooler 17. FIG. 4 is an exploded perspective view of the cooling fan unit 15 and the cooling device 14. As illustrated in FIG. 4, the frame member 18 includes a frame body 21, a left pillar portion 22, and a right pillar portion 23.

The frame body 21, the left pillar portion 22, and the right pillar portion 23 are formed with metal pipes or bent metal plates. However, the frame body 21, the left pillar portion 22, and the right pillar portion 23 may be formed with a material other than a metal. The frame body 21 covers the radiator core 16 from the right and left and from above. The frame body 21 includes a left frame body 24, a right frame body 25, and an upper frame body 26. The left frame body 24 is disposed to the left of the radiator core 16. The right frame body 25 is disposed to the right of the radiator core 16. The upper frame body 26 is disposed above the radiator core 16. The left frame body 24 and the right frame body 25 overlap the radiator core 16 as seen from the left-right direction. The upper frame body 26 overlaps the radiator core 16 as seen from the up-down direction.

The left pillar portion 22 and the right pillar portion 23 are positioned rearward of the frame body 21. That is, the left pillar portion 22 and the right pillar portion 23 are positioned rearward of the radiator core 16. In other words, the left pillar portion 22 and the right pillar portion 23 are positioned further to the engine 13 side than the radiator core 16. The left pillar portion 22 and the right pillar portion 23 extend in the up-down direction. The left pillar portion 22 includes a left inside surface 27. The right pillar portion 23 includes a right inside surface 28. The left inside surface 27 and the right inside surface 28 are disposed so as to face each other.

The cooling fan unit 15 is disposed between the engine 13 and the cooling device 14 in the left-right direction of the vehicle. The cooling fan unit 15 includes a cooling fan 31 and a fan bracket 32.

The cooling fan 31 is a so-called propeller fan. As illustrated in FIG. 3, the cooling fan 31 includes a boss portion 33 and a plurality of vane portions 34. The plurality of vane portions 34 extend in the radial direction from the boss portion 33. An air flow that flows through the cooling device 14 is created by the rotation of the cooling fan 31. Only a portion of the plurality of vane portions 34 are provided with the reference numeral "34" in the drawings, and the reference numerals of the other vane portions are omitted.

As illustrated in FIG. 2, the left pillar portion 22 is positioned to the left of the cooling fan 31. The right pillar portion 23 is positioned to the right of the cooling fan 31. The left pillar portion 22 and the right pillar portion 23 overlap the cooling fan 31 as seen from the left-right direction.

The cooling fan 31 is disposed between the left inside surface 27 and the right inside surface 28. The lower end of the left pillar portion 22 is positioned lower than the cooling fan 31. The upper end of the left pillar portion 22 is positioned higher than the cooling fan 31. The lower end of the right pillar portion 23 is positioned lower than the cooling fan 31. The upper end of the right pillar portion 23 is positioned higher than the cooling fan 31.

As illustrated in FIG. 3, the cooling fan unit 15 includes a fan motor 35. The fan motor 35 drives the cooling fan 31. The fan motor 35 is attached to the fan bracket 32.

Figure 5:
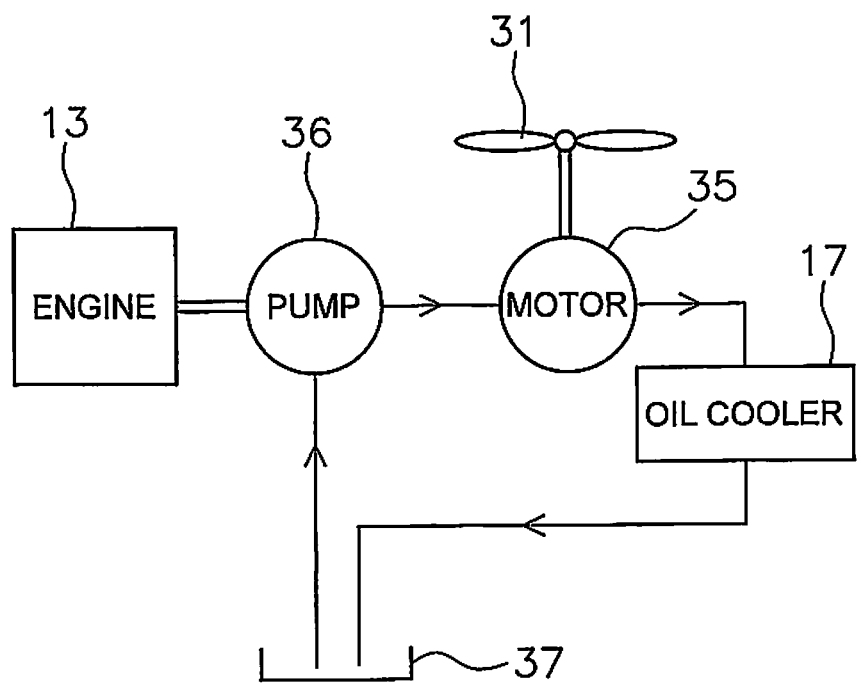
FIG. 5 is a schematic view illustrating a drive system of the cooling fan.

FIG. 5 is a schematic view illustrating a drive system of the cooling fan 31. As illustrated in FIG. 5, the work vehicle 100 includes a hydraulic pump 36. The hydraulic pump 36 is positioned inside the engine compartment 9 with the engine 13. The hydraulic pump 36 is driven by the engine 13 to discharge hydraulic fluid. The fan motor 35 is a hydraulic motor. The fan motor 35 is driven by hydraulic fluid discharged from the hydraulic pump 36. The fan motor 35 rotates the cooling fan 31. The hydraulic fluid flows from the fan motor 35 to the oil cooler 17 and is cooled in the oil cooler 17. The hydraulic fluid returns from the oil cooler 17 to a hydraulic fluid tank 37.

The fan bracket 32 supports the cooling fan 31 and the fan motor 35. The fan bracket 32 is attached in a detachable manner to the left pillar portion 22 and the right pillar portion 23. The fan bracket 32 has a planar shape that extends in the left-right direction. The fan bracket 32 extends to a position further to the left than the cooling fan 31. The fan bracket 32 extends to a position further to the right than the cooling fan 31. That is, the fan bracket 32 is larger than the cooling fan 31 in the left-right direction. However, the fan bracket 32 is smaller than the cooling fan 31 in the up-down direction.

The fan bracket 32 is smaller than the interval in the left-right direction between the left inside surface 27 and the right inside surface 28. As illustrated in FIG. 4, a left attachment member 38 is fixed to the left pillar portion 22. The left attachment member 38 has a planar shape that extends in the up-down direction. The left attachment member 38 protrudes to the right from the left inside surface 27. A right attachment member 39 is fixed to the right pillar portion 23. The right attachment member 39 has a planar shape that extends in the up-down direction. The right attachment member 39 protrudes to the left from the right inside surface 28.

The left attachment member 38 and the right inside surface 28 may be fixed respectively to the left inside surface 27 and the right attachment member 39 by welding, for example. Alternatively, the left attachment member 38 and the right inside surface 28 may be fixed respectively to the left inside surface 27 and the right attachment member 39 by another fixing means.

A left edge portion 41 of the fan bracket 32 is attached to the left attachment member 38. A right edge portion 42 of the fan bracket 32 is attached to the right attachment member 39. The fan bracket 32 is attached in a detachable manner to the left attachment member 38 and the right attachment member 39. For example, the fan bracket 32 may be attached to the left attachment member 38 and the right attachment member 39 with bolts. Alternatively, the fan bracket 32 may be attached in a detachable manner to the left attachment member 38 and the right attachment member 39 with another attachment means.

As illustrated in FIG. 4, the fan bracket 32 includes a body section 43, a left opening 44, and a right opening 45. The body section 43 is positioned in the middle of the fan bracket 32 in the left-right direction. The cooling fan 31 and the fan motor 35 are attached to the body section 43. The body section 43 is positioned between the left opening 44 and the right opening 45. The left opening 44 is positioned between the body section 43 and the left edge portion 41. The right opening 45 is positioned between the body section 43 and the right edge portion 42. The left opening 44 and the right opening 45 overlap the vane portions 34 as seen from the front-back direction. The air flow generated by the cooling fan 31 is able to pass through the left opening 44 and the right opening 45.

A regulating member 50 is attached to the frame member 18. The regulating member 50 guides the cooling fan unit 15 when removing the cooling fan unit 15. The regulating member 50 includes a first left regulating portion 51 and a first right regulating portion 52. The first left regulating portion 51 is attached to the left pillar portion 22. The first right regulating portion 52 is attached to the right pillar portion 23. The first left regulating portion 51 and the first right regulating portion 52 have a planar shape that extends in the left-right direction.

The first left regulating portion 51 is attached to the left inside surface 27. The first left regulating portion 51 protrudes to the right from the left inside surface 27. The first right regulating portion 52 is attached to the right inside surface 28. The first right regulating portion 52 protrudes to the left from the right inside surface 28. The first left regulating portion 51 is smaller than the left attachment member 38 in the up-down direction. The first right regulating portion 52 is smaller than the right attachment member 39 in the up-down direction.

The interval in the left-right direction between the first left regulating portion 51 and the first right regulating portion 52 is larger than the diameter of the cooling fan 31. The interval in the left-right direction between the first left regulating portion 51 and the first right regulating portion 52 is smaller than the dimension in the left-right direction of the fan bracket 32. The first left regulating portion 51 and the first right regulating portion 52 are disposed higher than the fan bracket 32. The first left regulating portion 51 is disposed above the left attachment member 38. The first right regulating portion 52 is disposed above the right attachment member 39.

The interval in the up-down direction between the first left regulating portion 51 and the fan bracket 32 is smaller than the dimension in the up-down direction of the fan bracket 32. The interval in the up-down direction between the first right regulating portion 52 and the fan bracket 32 is smaller than the dimension in the up-down direction of the fan bracket 32. The interval in the up-down direction between the first left regulating portion 51 and the left attachment member 38 is smaller than the dimension in the up-down direction of the fan bracket 32. The interval in the up-down direction between the first right regulating portion 52 and the right attachment member 39 is smaller than the dimension in the up-down direction of the fan bracket 32.

As illustrated in FIG. 3, the fan bracket 32 includes a first surface 46 and a second surface 47. The first surface 46 faces the radiator core 16. The second surface 47 faces the engine 13. That is, the first surface 46 is the front surface of the fan bracket 32 and the second surface 47 is the rear surface of the fan bracket 32. The first surface 46 comes into contact with the left attachment member 38 and the right attachment member 39 and is attached to the left attachment member 38 and the right attachment member 39.

The first left regulating portion 51 and the first right regulating portion 52 are positioned further to the radiator core 16 side than the first surface 46 in the direction from the engine 13 to the cooling device 14. That is, the first left regulating portion 51 and the first right regulating portion 52 are positioned forward of the first surface 46. A distance d1 between the first left regulating portion 51 and the first surface 46 in the front-back direction is less than a distance d2 between the cooling fan 31 and the radiator core 16. In the present embodiment, the first left regulating portion 51 is disposed approximately flush with the left attachment member 38. The first right regulating portion 52 is disposed approximately flush with the right attachment member 39.

The regulating member 50 further includes a second left regulating portion 53 and a second right regulating portion 54. The second left regulating portion 53 is attached to the left pillar portion 22 and is disposed higher than the first left regulating portion 51. The second right regulating portion 54 is attached to the right pillar portion 23 and is disposed higher than the first right regulating portion 52. The second left regulating portion 53 and the second right regulating portion 54 are positioned lower than the upper edge of the radiator core 16. The second left regulating portion 53 has a shape similar to the first left regulating portion 51. The second right regulating portion 54 has a shape that is similar to the first right regulating portion 52. However, the shapes of the second left regulating portion 53 and the second right regulating portion 54 may differ from the shapes of the first left regulating portion 51 and the first right regulating portion 52 respectively.

The interval in the up-down direction between the first left regulating portion 51 and the second left regulating portion 53 is smaller than the dimension in the up-down direction of the fan bracket 32. The interval in the up-down direction between the first right regulating portion 52 and the second right regulating portion 54 is smaller than the dimension in the up-down direction of the fan bracket 32.

Figure 6:
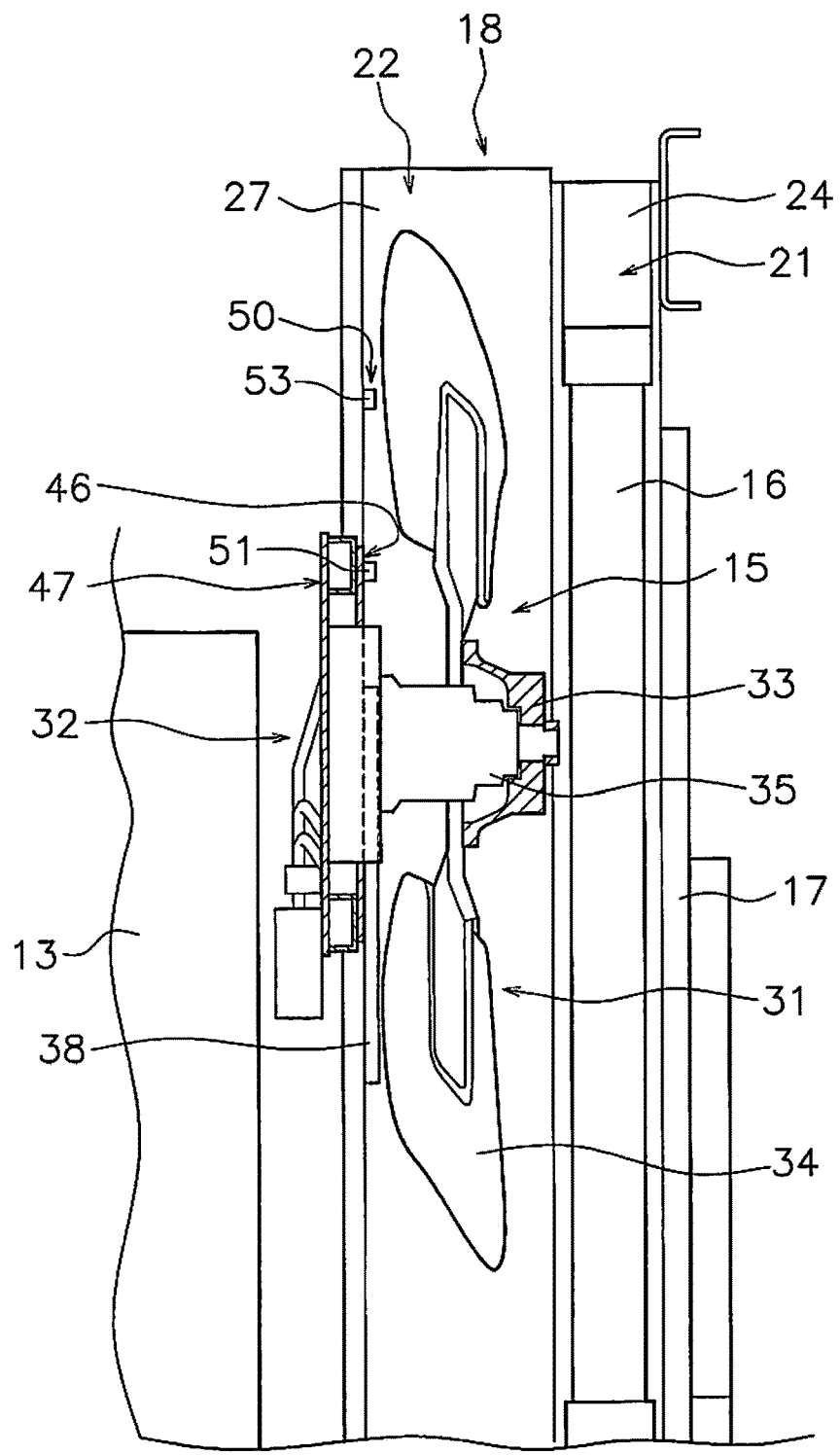
FIG. 6 illustrates movement of the cooling fan unit when removing the cooling fan unit from the work vehicle.
Figure 7:
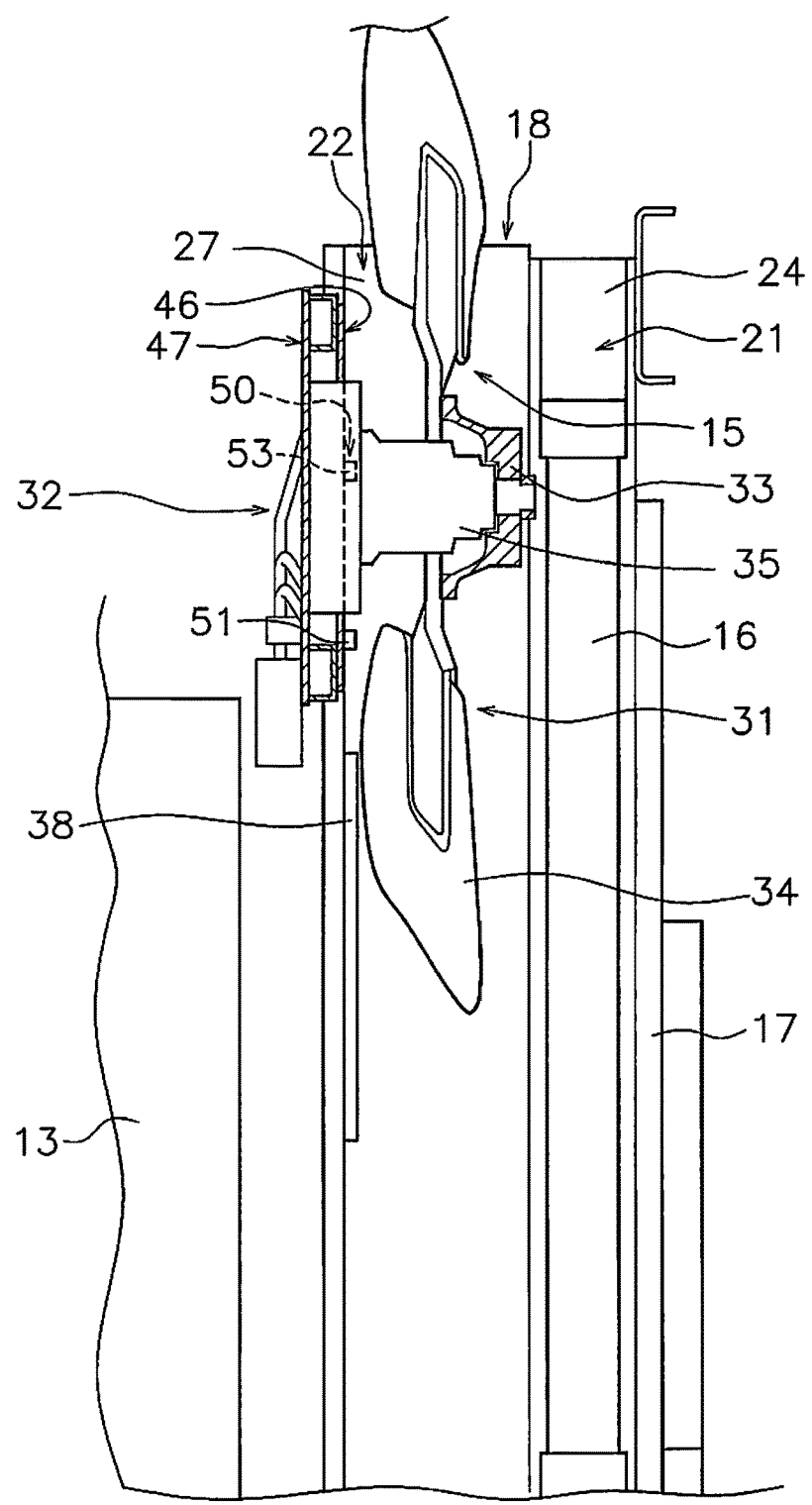
FIG. 7 illustrates movement of the cooling fan unit when removing the cooling fan unit from the work vehicle.
Figure 8:
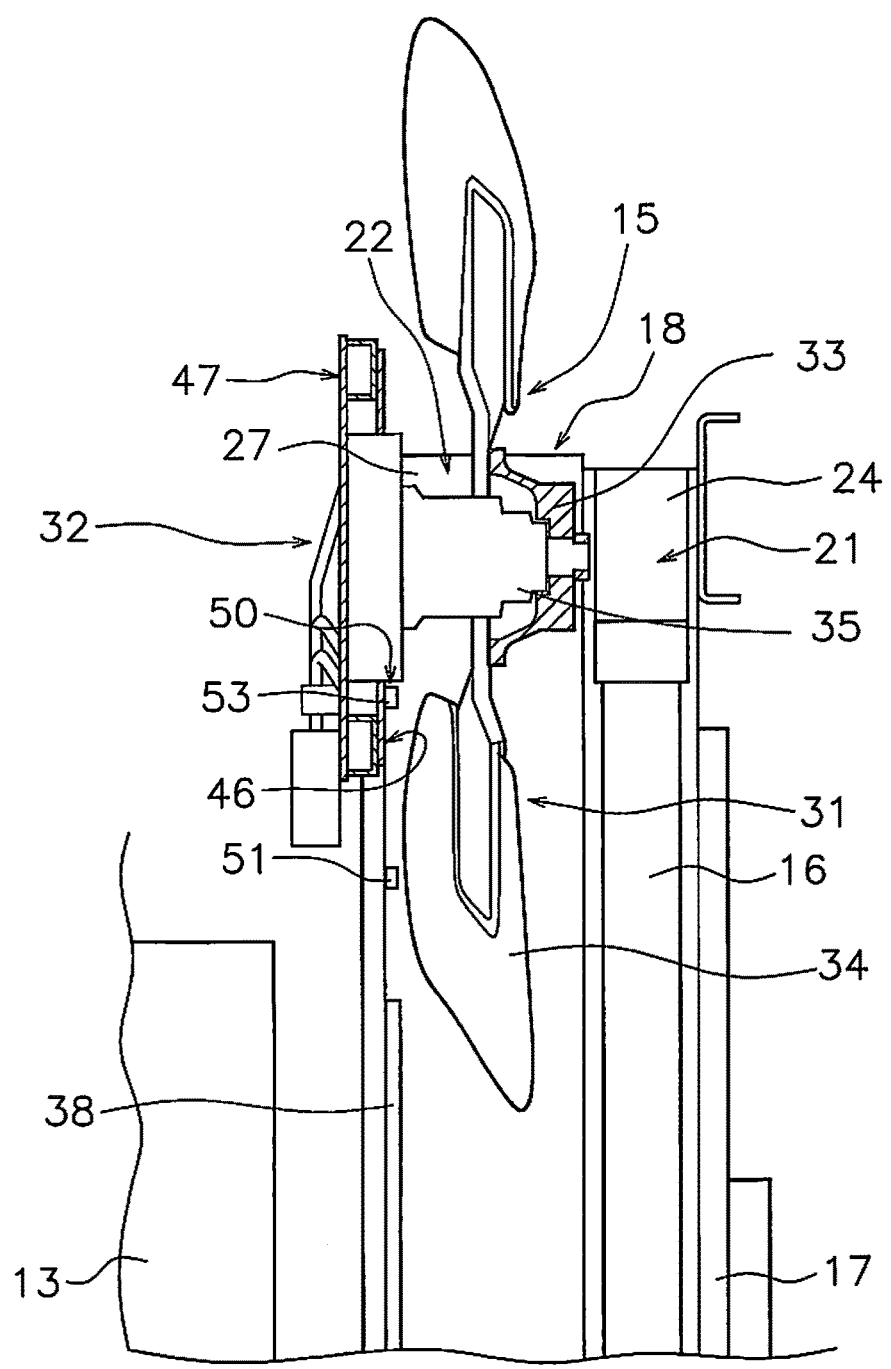
FIG. 8 illustrates movement of the cooling fan unit when removing the cooling fan unit from the work vehicle.

FIGS. 6 to 8 illustrate movement of the cooling fan unit 15 when removing the cooling fan unit 15 from the work vehicle 100. The cooling fan unit 15 is hoisted by a conveying means such as a wire and moved upward whereby the cooling fan unit 15 is removed from the engine compartment 9.

As illustrated in FIG. 3, first, the fixation between the fan bracket 32 and the left attachment member 38 is released. The fixation between the fan bracket 32 and the left attachment member 38 is also released. The cooling fan unit 15 is then moved upward by lifting the cooling fan unit 15.

As illustrated in FIG. 6, the first left regulating portion 51 at this time is positioned at the same height as the fan bracket 32 and is positioned between the fan bracket 32 and the radiator core 16. While not illustrated, the first right regulating portion 52 is the same as the first left regulating portion 51. As a result, the first left regulating portion 51 and the first right regulating portion 52 come into contact with the fan bracket 32 whereby the movement of the cooling fan unit 15 in the direction approaching the radiator core 16 is restricted.

Moreover, when the cooling fan unit 15 is moved upward as illustrated in FIG. 7, the first left regulating portion 51 and the second left regulating portion 53 are positioned at the same height as the fan bracket 32 and are positioned between the fan bracket 32 and the radiator core 16. While not illustrated, the first right regulating portion 52 and the second right regulating portion 54 are the same as the first left regulating portion 51 and the second left regulating portion 53. As a result, the first left regulating portion 51, the second left regulating portion 53, the first right regulating portion 52, and the second right regulating portion 54 come into contact with the fan bracket 32 whereby the movement of the cooling fan unit 15 in the direction approaching the radiator core 16 is restricted.

Moreover, when the cooling fan unit 15 is moved upward as illustrated in FIG. 8, the second left regulating portion 53 is positioned at the same height as the fan bracket 32 and is positioned between the fan bracket 32 and the radiator core 16. While not illustrated, the second right regulating portion 54 is the same as the second left regulating portion 53. As a result, the second left regulating portion 53 and the second right regulating portion 54 come into contact with the fan bracket 32 whereby the movement of the cooling fan unit 15 in the direction approaching the radiator core 16 is restricted.

In this state, the front edge of the cooling fan 31 is positioned higher than the radiator core 16. The first left regulating portion 51 and the first right regulating portion 52 are positioned lower than the fan bracket 32.

In the work vehicle 100 according to the present embodiment explained above, the cooling fan unit 15 is guided by the regulating member 50 when removing the cooling fan unit 15. As a result, swinging of the cooling fan unit 15 can be suppressed when removing the cooling fan unit 15 from the work vehicle 100. Consequently, interference with nearby devices when removing the cooling fan unit 15 from the work vehicle 100 can be suppressed.

The regulating member 50 regulates the movement of the cooling fan unit 15 in the direction approaching the radiator core 16 when the cooling fan unit 15 is lifted upward. As a result, swinging of the cooling fan unit 15 toward the radiator core 16 can be suppressed by the regulating member 50 when removing the cooling fan unit 15 from the work vehicle 100. Consequently, interference with the radiator core 16 when removing the cooling fan unit 15 from the work vehicle 100 can be suppressed.

The interval in the left-right direction between the first left regulating portion 51 and the first right regulating portion 52 is larger than the diameter of the cooling fan 31. As a result, the first left regulating portion 51 and the first right regulating portion 52 suppress interference with the cooling fan 31 when removing the cooling fan unit 15.

The interval in the left-right direction between the first left regulating portion 51 and the first right regulating portion 52 is smaller than the width in the left-right direction of the fan bracket 32. As a result, the fan bracket 32 can be easily brought into contact with the first left regulating portion 51 and the first right regulating portion 52 when removing the cooling fan unit 15. As a result, the cooling fan unit 15 can be easily guided by the regulating member 50.

The interval in the up-down direction between the first left regulating portion 51 and the fan bracket 32 is smaller than the dimension in the up-down direction of the fan bracket 32. The interval in the up-down direction between the first right regulating portion 52 and the fan bracket 32 is smaller than the dimension in the up-down direction of the fan bracket 32. As a result, swinging of the fan bracket 32 through the interval between the first left regulating portion 51 and the fan bracket 32 or through the interval between the first right regulating portion 52 and the fan bracket 32, can be suppressed when lifting the cooling fan unit 15 upward.

The distance between the first left regulating portion 51 and the first surface 46 in the direction from the engine 13 toward the cooling device 14 is less than the distance between the cooling fan 31 and the radiator core 16. The distance between the first right regulating portion 52 and the first surface 46 is less than the distance between the cooling fan 31 and the radiator core 16. As a result, the movement amount of the cooling fan unit 15 until the first surface 46 comes into contact with the first left regulating portion 51 or the first right regulating portion 52 is limited to a small amount. Consequently, interference with the radiator core 16 can be suppressed.

The second left regulating portion 53 and the second right regulating portion 54 are disposed in the same way as the first left regulating portion 51 and the first right regulating portion 52 respectively. Therefore, the same abovementioned effect as exhibited by the first left regulating portion 51 and the first right regulating portion 52 can be achieved with the second left regulating portion 53 and the second right regulating portion 54.

The interval in the up-down direction between the first left regulating portion 51 and the second left regulating portion 53 is smaller than the dimension in the up-down direction of the fan bracket 32. The interval in the up-down direction between the first right regulating portion 52 and the second right regulating portion 54 is smaller than the dimension in the up-down direction of the fan bracket 32. As a result, swinging of the fan bracket 32 through the interval between the first left regulating portion 51 and the second left regulating portion 53 or through the interval between the first right regulating portion 52 and the second right regulating portion 54, can be suppressed when lifting the cooling fan unit 15 upward.

The fan motor 35 that drives the cooling fan 31 is attached to the fan bracket 32. Therefore, the cooling fan unit 15 swings easily when removing the cooling fan unit 15 due to the heavy fan motor 35 being attached to the fan bracket 32. However in the work vehicle 100 according to the present embodiment, the cooling fan unit 15 is guided by the regulating member 50 whereby interference with nearby devices is suppressed.

Although the embodiment of the present invention has been described so far, the present invention is not limited to the above embodiment and various modifications may be made within the scope of the invention.

The work vehicle is not limited to a hydraulic excavator and may be another vehicle such as a bulldozer, a wheel loader, or a motor grader or the like.

The structure of the cooling fan unit 15 may be changed. For example, the shape of the fan bracket 32 may be changed. The fan motor 35 is not limited to a hydraulic motor and may be an electric motor. The fan motor 35 may be attached to another member other than the fan bracket 32.

The cooling fan unit 15 is attached to the frame member 18 of the cooling device 14 in the above embodiment. However, the cooling fan unit 15 may be attached to another member. For example, the cooling fan unit 15 may be attached to a frame member separate from the cooling device 14. Alternatively, the cooling fan unit 15 may be attached to the engine 13.

The structure of the cooling device 14 may be changed. For example, the oil cooler 17 may be disposed between the radiator core 16 and the engine 13. Alternatively, the radiator core 16 and the oil cooler 17 may be disposed in a row in the left-right direction.

Figure 9:
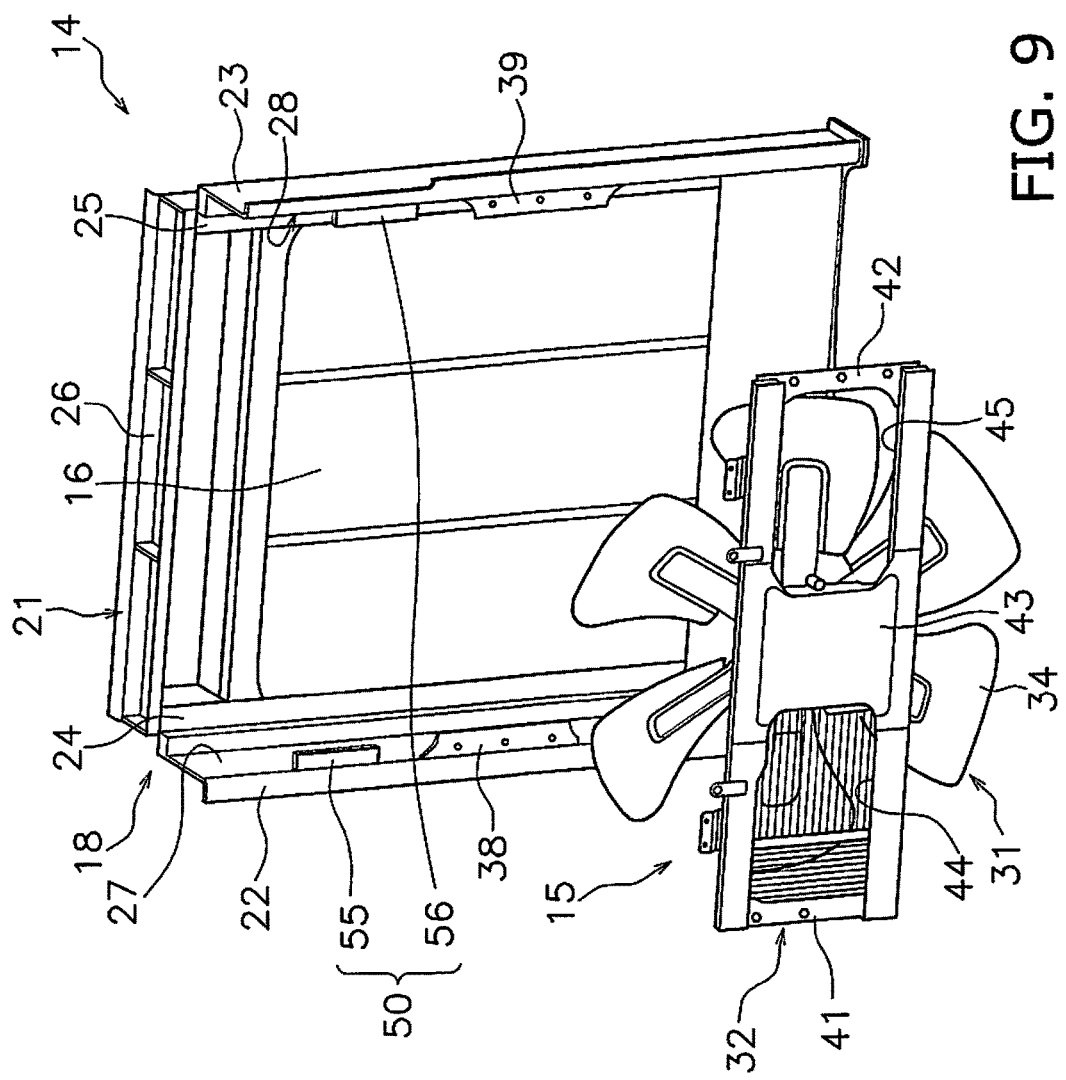
FIG. 9 illustrates a regulating member according to a first modified example.

The regulating member 50 is not limited to being attached to the frame member 18 and may be attached to another member. The structure of the regulating member 50 may be changed. For example, the shapes of the first left regulating portion 51 and the first right regulating portion 52 may be changed. FIG. 9 illustrates the regulating member 50 according to a first modified example. As illustrated in FIG. 9, a first left regulating portion 55 and a first right regulating portion 56 may have an elongated shape in the up-down direction.

The regulating member 50 regulates the movement of the cooling fan unit 15 toward the radiator core 16 when removing the cooling fan unit 15 from the work vehicle 100 in the above embodiment. However, the regulating member 50 may regulate the movement of the cooling fan unit 15 in another direction.

Figure 10:
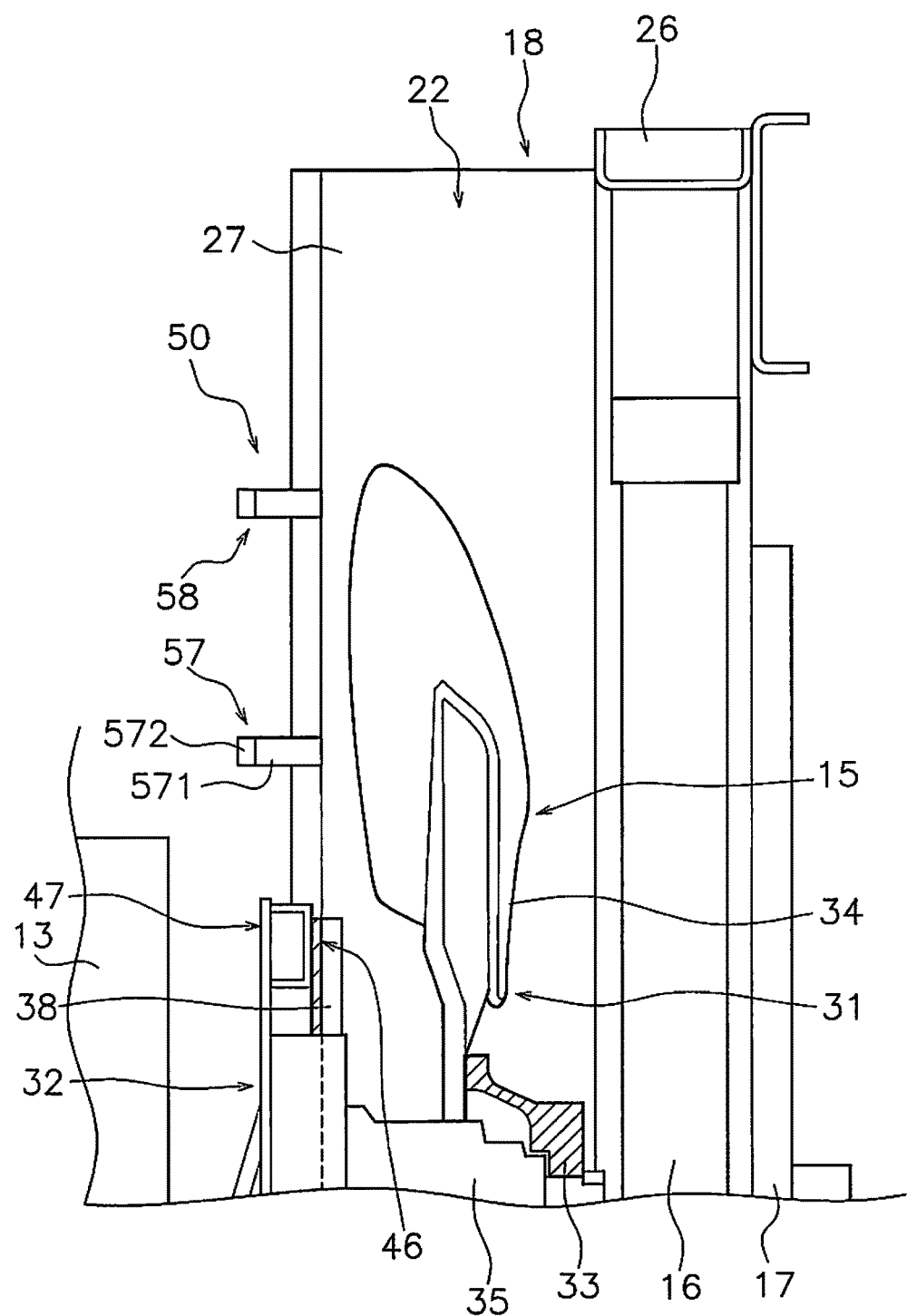
FIG. 10 illustrates the regulating member according to a second modified example.
Figure 11:
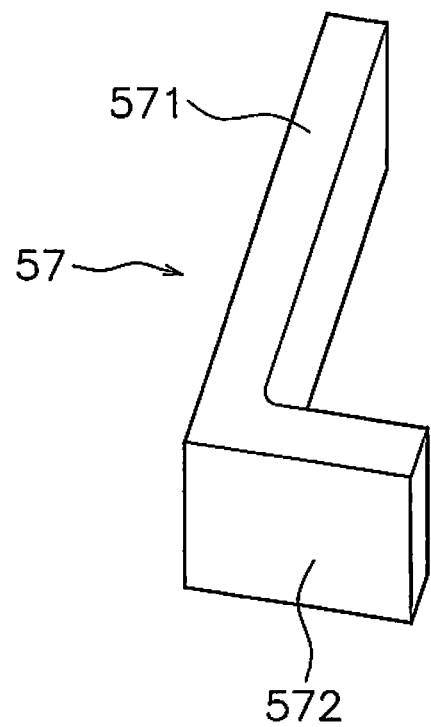
FIG. 11 illustrates the regulating member according to the second modified example.

For example, the regulating member 50 may regulate the movement of the cooling fan unit 15 toward the engine 13. FIG. 10 illustrates the regulating member 50 according to a second modified example. The regulating member 50 according to the second modified example includes a first left regulating portion 57 and a second left regulating portion 58. FIG. 11 is a perspective view illustrating the first left regulating portion 57 according to the second modified example.

As illustrated in FIG. 11, the first left regulating portion 57 according to the second modified example has a shape that is bent to form an L-shape. Specifically, the first left regulating portion 57 includes a left support portion 571 and a left contact portion 572. The left support portion 571 extends from the left pillar portion 22 toward the engine 13. The left contact portion 572 protrudes to the right from the left support portion 571. The first left regulating portion 57 has a shape that is bent between the left support portion 571 and the left contact portion 572. The left contact portion 572 is disposed further to the engine 13 side than the fan bracket 32.

A second left regulating portion 58 has the same shape as the first left regulating portion 57. Although not illustrated, the regulating member 50 according to the second modified example includes a first right regulating portion and a second right regulating portion. The first right regulating portion and the second right regulating portion according to the second modified example are disposed in left-right symmetry with the first left regulating portion 57 and the second left regulating portion 58 according to the second modified example.

When the cooling fan unit 15 is moved upward in the second modified example, the left contact portion 572 of the first left regulating portion 57 comes into contact with the second surface 47 of the fan bracket 32 whereby movement of the cooling fan unit 15 in the direction approaching the engine 13 is regulated.

Figure 12:
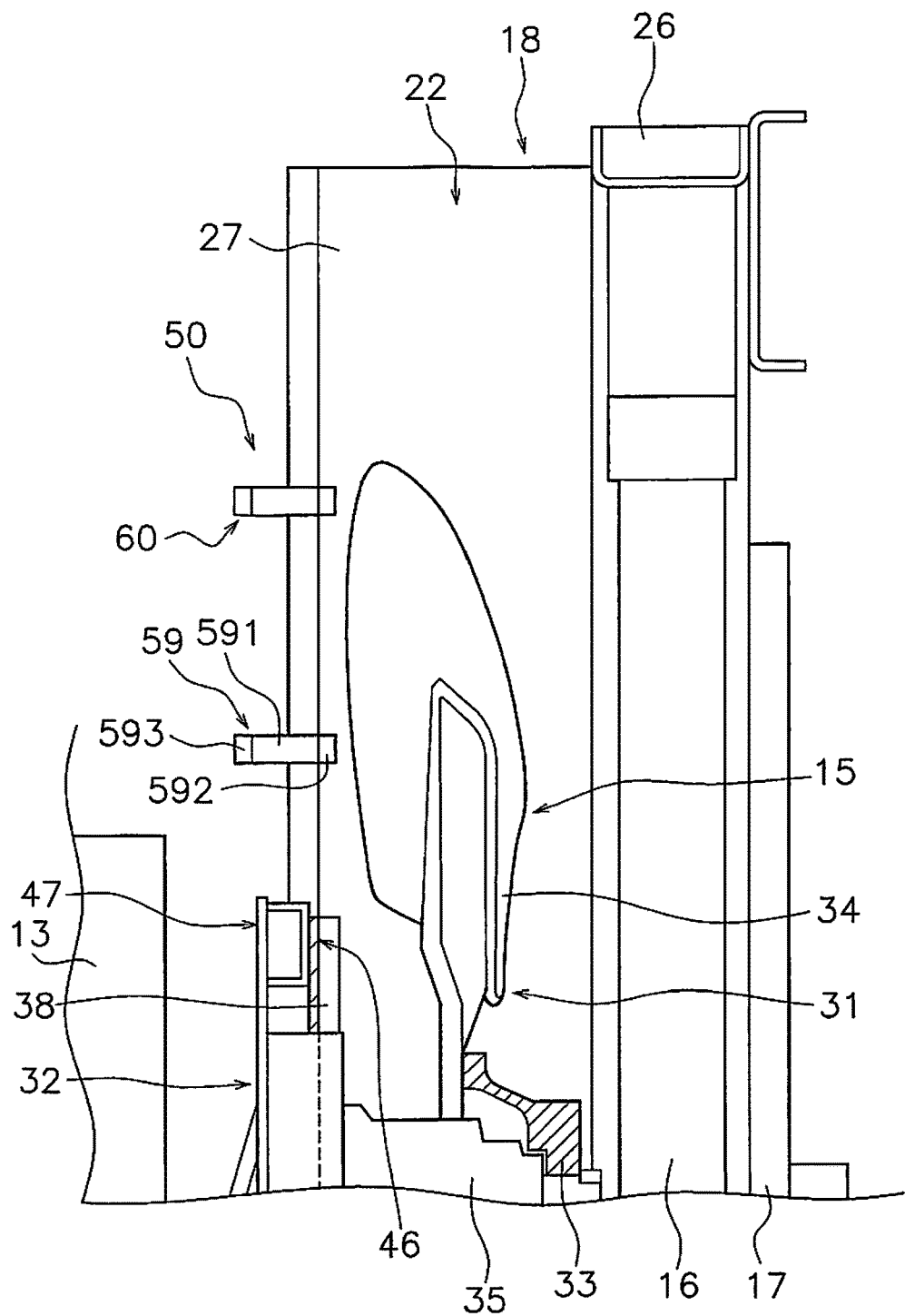
FIG. 12 illustrates the regulating member according to a third modified example.
Figure 13:
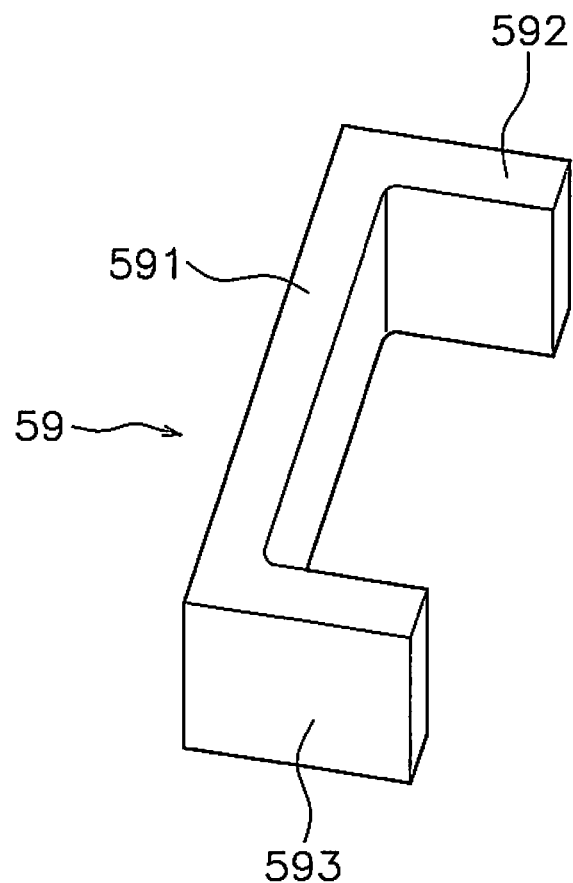
FIG. 13 illustrates the regulating member according to the third modified example.

The regulating member 50 may regulate the movement of the cooling fan unit 15 both in the direction toward the radiator core 16 and in the direction toward the engine 13. FIG. 12 illustrates the regulating member 50 according to a third modified example. The regulating member 50 according to the third modified example includes a first left regulating portion 59 and a second left regulating portion 60. FIG. 13 is a perspective view illustrating the first left regulating portion 59 according to the third modified example.

As illustrated in FIG. 12, the first left regulating portion 59 according to the third modified example includes a left support portion 591, a first left contact portion 592, and a second left contact portion 593. The left support portion 591 extends from the left pillar portion 22 toward the engine 13. The first left contact portion 592 and the second left contact portion 593 protrude to the right from the left support portion 591. The first left regulating portion 59 has a shape that is bent between the left support portion 591 and the first left contact portion 592. The first left regulating portion 59 has a shape that is bent between the left support portion 591 and the second left contact portion 593. The first left contact portion 592 is disposed further to the radiator core 16 side than the fan bracket 32. The second left contact portion 593 is disposed further to the engine 13 side than the fan bracket 32.

The second left regulating portion 60 has a shape similar to the first left regulating portion 59. Although not illustrated, the regulating member 50 according to the third modified example includes a first right regulating portion and a second right regulating portion. The first right regulating portion and the second right regulating portion according to the third modified example are disposed in left-right symmetry with the first left regulating portion 59 and the second left regulating portion 60 according to the third modified example.

When the cooling fan unit 15 is moved upward, the first left contact portion 592 comes into contact with the first surface 46 of the fan bracket 32 whereby movement of the cooling fan unit 15 is regulated in the direction approaching the radiator core 16 in the third modified example. Moreover, the second left contact portion 593 comes into contact with the second surface 47 of the fan bracket 32 whereby movement of the cooling fan unit 15 in the direction approaching the engine 13 is regulated.

The number of the left regulating portions is not limited to two. The number of the right regulating portions is not limited to two. For example, three or more left regulating portions and three or more right regulating portions may be provided. Alternatively, the number of the left regulating portions may be one. The number of the right regulating portions may be one. For example, the second left regulating portion and the second right regulating portion may be omitted.

INDUSTRIAL APPLICABILITY

According to the present invention, interference with nearby devices when removing the cooling fan unit from the work vehicle can be suppressed.

What is claimed is:

1. A work vehicle comprising:
   an engine;
   a cooling device including a radiator core, the cooling device being disposed facing the engine;
   a cooling fan unit including a cooling fan and a fan bracket supporting the cooling fan, the cooling fan unit being disposed between the engine and the cooling device, the fan bracket being smaller than the cooling fan in an up-down direction of the work vehicle;
   a regulating member disposed above the fan bracket of the cooling fan unit when the cooling fan unit is in an installed state, the regulating member regulating movement of the cooling fan unit in a horizontal direction when the cooling fan unit is lifted upward.

2. The work vehicle according to claim 1, wherein
   the cooling device further includes a frame member supporting the radiator core,
   the regulating member is attached to the frame member, and
   the fan bracket is attached to the frame member below the regulating member.

3. The work vehicle according to claim 1, wherein
   the regulating member regulates the movement of the cooling fan unit in a direction approaching the radiator core when the cooling fan unit is lifted upward.

4. The work vehicle according to claim 1, wherein
   the frame member includes
   a left pillar portion positioned to the left of the cooling fan when viewed from the engine toward the cooling device and
   a right pillar portion positioned to the right of the cooling fan, and the regulating member includes a first left regulating portion attached to the left pillar portion and a first right regulating portion attached to the right pillar portion.

5. The work vehicle according to claim 4, further comprising an attachment member attaching the fan bracket to the left pillar portion and the right pillar portion.

6. The work vehicle according to claim 5, wherein an interval in a left-right direction of the work vehicle between the first left regulating portion and the first right regulating portion is smaller than a width in the left-right direction of the fan bracket.

7. The work vehicle according to claim 5, wherein an interval in the up-down direction of the work vehicle between the first left regulating portion and the fan bracket is less than a dimension in the up-down direction of the fan bracket, and an interval in the up-down direction between the first right regulating portion and the fan bracket is less than the dimension in the up-down direction of the fan bracket.

8. The work vehicle according to claim 5, wherein the fan bracket includes a first surface that faces the radiator core and a second surface that faces the engine, and the first left regulating portion and the first right regulating portion are positioned further to a radiator core side than the first surface in a direction from the engine to the cooling device.

9. The work vehicle according to claim 8, wherein in a direction from the engine toward the cooling device, an interval between the first left regulating portion and the first surface is less than an interval between the cooling fan and the radiator core, and an interval between the first right regulating portion and the first surface is less than an interval between the cooling fan and the radiator core.

10. The work vehicle according to claim 4, wherein an interval in a left-right direction of the work vehicle between the first left regulating portion and the first right regulating portion is larger than a diameter of the cooling fan.

11. The work vehicle according to claim 4, wherein the first left regulating portion has a planar shape that extends rightward in a left-right direction of the work vehicle, and the first right regulating portion has a planar shape that extends in a leftward in the left-right direction.

12. The work vehicle according to claim 4, wherein the regulating member further includes a second left regulating portion attached to the left pillar portion in a position higher than the first left regulating portion and a second right regulating portion attached to the right pillar portion in a position higher than the first right regulating portion;

an interval in the up-down direction between the first left regulating portion and the second left regulating portion is smaller than a dimension in the up-down direction of the fan bracket; and an interval in the up-down direction between the first right regulating portion and the second right regulating portion is smaller than the dimension in the up-down direction of the fan bracket.

13. The work vehicle according to claim 4, wherein the first left regulating portion and the first right regulating portion have an elongated shape in the up-down direction.

14. The work vehicle according to claim 4, wherein each of the first left regulating portion and the first right regulating portion has an L-shape formed by a support portion and a contact portion, the support portion extending toward the engine in a front-back direction of the work vehicle and the contact portion extending inward toward the cooling fan in a left-right direction of the work vehicle, the contact portion being arranged to regulate movement of the cooling fan unit in the horizontal direction when the cooling fan unit is lifted upward.

15. The work vehicle according to claim 4, wherein each of the first left regulating portion and the first right regulating portion has an C-shape formed by a support portion and two contact portions at opposite ends of the support portion, the support portion extending toward the engine in a front-back direction of the work vehicle and the contact portions extending inward toward the cooling fan in a left-right direction of the work vehicle, the contact portions being arranged to regulate movement of the cooling fan unit in the horizontal direction when the cooling fan unit is lifted upward.

* * * * *